Jan. 12, 1932.  J. W. DIEDERICH  1,841,015
SHACKLE LINK
Filed Feb. 25, 1930

John W. Diederich
INVENTOR.

BY
ATTORNEYS.

Patented Jan. 12, 1932

1,841,015

UNITED STATES PATENT OFFICE

JOHN W. DIEDERICH, OF DETROIT, MICHIGAN, ASSIGNOR TO HUGH C. LORD, OF ERIE, PENNSYLVANIA

SHACKLE LINK

Application filed February 25, 1930. Serial No. 431,200.

The present invention is designed to improve shackles. In providing shackles, and as exemplified herein, for springs of automobiles cheapness, lightness and strength are of great consideration together with rigidity. This is particularly so in connection with rubber joints with which the links are connected. The present invention is designed to form such links and they are of such form that they may be readily stamped without other machining and make a light, strong structure. Features and details of the invention will appear from the specification and claims.

A preferred embodiment of the invention is illustrated in the accompanying drawings as follows:—

Figure 1:
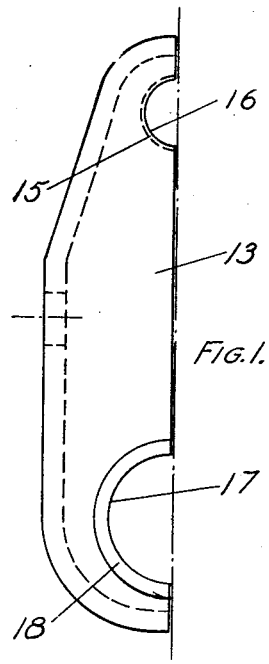

Fig. 1 shows a side elevation of a link half.

Figure 2:
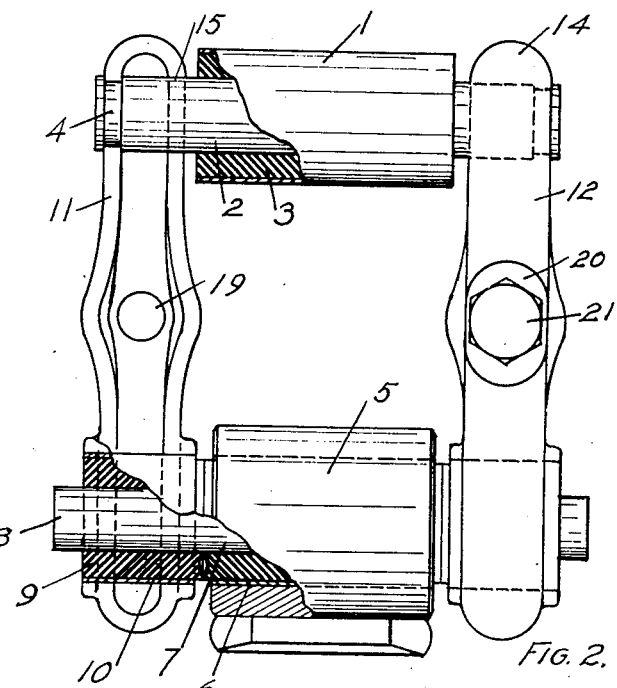

Fig. 2 a rear view of a complete shackle link construction with the joints attached, one half of the link being removed at one side to better show construction and one of the joints being formed of a plurality of joint members.

Figure 3:
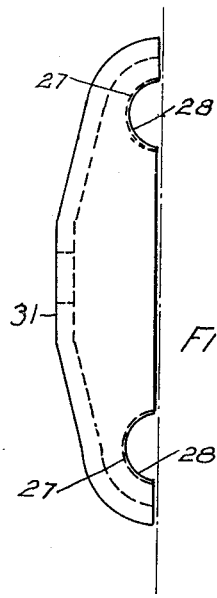

Fig. 3 a side elevation of a link half of a modified form.

Figure 4:
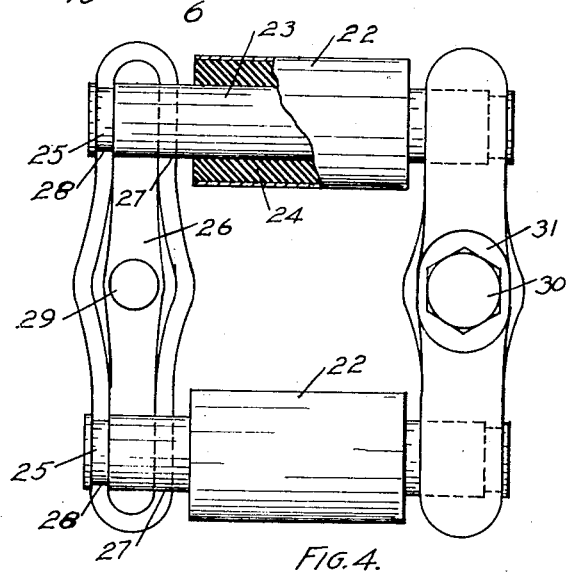

Fig. 4 a view of a complete shackle construction utilizing the link form shown in Fig. 3, one half of the link on one side of the construction being removed to better show construction.

1 marks the shell of a rubber shackle joint, 2 a central pin, and 3 a rubber bushing between the shell and pin. This joint, as illustrated, is adapted to be used in the goose neck for the rear spring shackle of an automobile. The joint pin extends outwardly from the joint and is provided with annular recesses 4 adjacent to its ends. A spring eye 5 engages the shell 6 of a central joint member. This is provided with a rubber bushing 7 which operates on a pin 8. Rubber bushings 9 are arranged on the ends of the pin 8 and these units are provided with shells 10. Links 11 are of channel form and have a channel base 12 which is curved and the side walls are flanges 13 of the channel. These side walls are closed by a continuation of the base at the end so that the outer surface of these link halves operate as a solid piece of metal. The walls at the upper ends of the link are provided with notches 15 and 16, the notch 15 being of a diameter equal to that of the pin 2 and the notch 16 being of a diameter to seat in the recesses 4. The lower ends of the link halves are provided with notches 17, the wall adjacent to the notches having the outwardly extending flanges 18 making the overall dimension from edge to edge of the flange equal to that of the shell 10.

The links have perforations 19 at their centers with flats 20 adjacent to the perforations. Clamping bolts 21 extend through these perforations and clamp the halves into clamping engagement with the pin 2 and the shell 10.

It will be noted that the engagement of the links with the pin 2 and particularly the interlocking of the wall adjacent to the notch 16 with the walls of the recess makes a very rigid connection between the pin 2 and the links and this interlocking also positively prevents any disengagement endwise of the links from the pin. The pin with the links forms a rigid U-shaped structure and thus the links are tied together through a metallic connection.

In the modified form which represents a shackle construction for the rear ends of an automobile front spring the joints have shoulders 22, central pins 23 and intervening rubber bushings 24. The pins have annular recesses 25 adjacent to their ends. Links 26 are similar in general construction with the upper end of the links 12, both ends being alike. The walls at both ends are provided with notches 27 and 28, the notch 28 being of a diameter to seat in the recesses 25. The links have perforations 29 with adjacent flats 31 and bolts 30 extend through the perforations clamping the halves in engagement with the pins.

What I claim as new is:—

1. A shackle link comprising halves having walls of channel form providing side webs with the edges of the webs face to face, the sides of the channels at the edges being opposingly notched to receive a shackle bolt.

2. A shackle link comprising halves having walls of channel form providing side webs with the edges of the webs face to face, the sides of the channels being connected at the ends of the link and being opposingly notched at the edges to receive a shackle bolt.

3. A shackle link comprising halves having walls of channel form providing side webs with the edges of the webs face to face, the sides of the channels being connected at the ends of the link and being opposingly notched to receive a shackle bolt and opposingly perforated intermediate the notches for receiving a clamping bolt.

4. A shackle link comprising halves having walls of channel form providing side webs with the edges of the webs face to face, the sides of the channels being connected at the ends of the link and being opposingly notched to receive a shackle bolt and opposingly perforated intermediate the notches for receiving a clamping bolt, said link having a clamping bolt extending through the perforations and the channels.

5. A shackle link comprising halves having walls of channel form providing side webs with the edges of the webs face to face, the sides of the channels at the edges being opposingly notched to receive a shackle bolt in combination with a shackle bolt recessed to receive a side wall of the link adjacent to a notch.

6. A shackle link comprising halves having walls of channel form providing side webs with the edges of the webs face to face, the sides of the channels at the edges being opposingly notched to receive a joint member and flanged at the notches to form a clamping surface on a joint member.

7. A shackle link comprising halves having walls of channel form providing side webs with the edges of the webs face to face, the sides of the channels being connected at the ends of the link and being opposingly notched at the edges to receive a joint member and flanged at the notches to form a clamping surface on a joint member.

8. A shackle link comprising halves having walls of channel form providing side webs with the edges of the webs face to face, the sides of the channels being connected at the ends of the link and notched at one end to receive a shackle bolt and notched at the opposite end and flanged around the last-mentioned notches to receive a joint member.

9. A shackle link comprising halves having walls of channel form providing side webs with the edges of the webs face to face, the sides of the channels being connected at the ends of the link and notched at one end to receive a shackle bolt and notched at the opposite end and flanged around the last-mentioned notches to receive a joint member in combination with a shackle pin having an annular recess receiving the notched side at one end and a joint member receiving a flanged notch at the opposite end; and a bolt intermediate the notches clamping the halves together.

10. In a rubber joint, the combination of a rubber joint member; a pin extending therefrom and having a recess adjacent to its ends; shackle links, each formed of halves having walls of channel form providing side webs with the edges of the webs face to face, one end of the shackle halves being opposingly notched to receive the pin, the sides of the notches being seated in the recesses of the pin, the opposite ends of each of the halves being notched and flanged adjacent to the notches; a joint member at the ends of the links having the flanged notches comprising a central unit and units within the flanged notches; and bolts intermediate the notches clamping the halves together.

In testimony whereof I have hereunto set my hand.

JOHN W. DIEDERICH.